Patented June 22, 1943

2,322,427

UNITED STATES PATENT OFFICE 2,322,427

CELLULOSE PRODUCT

Sidney Milton Edelstein, Elizabeth, N. J.

No Drawing. Application August 19, 1941,
Serial No. 407,445

7 Claims. (Cl. 260—212)

This invention relates to a cellulose product and the method of making it and particularly to a substantially complete dispersion of cellulose in sodium zincate solution Aqueous solutions including the compound generally considered as of the formula $Na_2ZnO_2$, made suitably by dissolving zinc oxide or hydroxide in an aqueous solution of sodium hydroxide and herein referred to as sodium zincate, have been used heretofore in the treatment of various cellulosic materials. It has been reported that the zincate solution is adapted to dissolve unmodified cellulose only partially. Also, I have found that there is difficulty due to the gelling or instability of solutions or dispersions of cellulose in sodium zincate solution.

I have now discovered a method for dissolving unmodified cellulose substantially completely and making, from either modified or unmodified cellulose, dispersions that are stable and that do not form non-flowing gels even on standing for several months or longer.

Briefly stated, my invention comprises forming an aqueous solution of sodium zincate, dissolving cellulose in the solution at a very low temperature to give a free-flowing dispersion, and then promptly warming the resulting dispersion to form a composition that is resistant to gelling on standing. In the preferred embodiment, the invention comprises the use as the dissolving or dispersing agent for the cellulose of a precooled solution of sodium zincate containing a large excess of sodium hydroxide over the amount required theoretically, that is, the proportion calculated to convert the zinc present to sodium zincate and the addition of the cellulose to the solution that has been precooled to a temperature not substantially above 5° C. but above the temperature of crystallization of any inorganic material present in the solution. In making relatively concentrated solutions of cellulose, the invention comprises ripening (ageing) the solutions so as to reduce their viscosity substantially.

Contrary to previous observations, I make a solution that is practically free from undissolved cellulose from almost any variety of substantially pure cellulose. Thus, I may use cotton linters, wood pulp, paper, or the like. If color and dirt are objectionable in the finished dispersion, then the linters are preferably bleached and purified to remove non-cellulosic materials and the wood pulp is a purified product consisting largely at least of alpha cellulose. It is significant, however, that with my process I can dissolve the cellulosic part of untreated cotton linters or mechanical wood pulp. In addition I may use modified cellulose, as, for example, rayon, either in new or waste form such as short cuts of rayon fiber, cuttings of Cellophane, or the like. The use of such relatively expensive forms of cellulose is not required, however, as I obtain by my process stable, non-setting dispersions of either the modified cellulose or unmodified cellulose by dissolving them in the sodium zincate solution as described.

Proportions of materials that have been found to be especially satisfactory in making zincate solution for dissolving cellulose are shown in the following tabulation, proportions here and elsewhere herein being expressed as parts by weight.

| Ingredient | Preferred proportion | Range of satisfactory proportions |
|---|---|---|
| Water | 100 | 100. |
| Zinc oxide | 3 | 2 to saturation proportion. |
| Sodium hydroxide | 10 | 8 to 15. |

Proportions of zinc oxide between 1 and 2 parts for 100 of water may be used with rayon waste or the like. As the proportion approaches 1, however, stable solutions are not obtained even with rayon waste. Such a low proportion is satisfactory only in case a solution that is stable for more than a few days is not required.

With respect to the range of proportions of zinc oxide that may be used, it is noted that there may be present zinc oxide in excess of the saturation quantity provided suspended and unreacted zinc is not objectionable for the purpose for which the cellulose solution is intended. Any undissolved zinc in my process represents a waste of material and is without substantial benefit.

Using the zinc oxide and sodium hydroxide in about the preferred proportions, there is obtained a more rapid solution of the cellulose that is used and less difficulty from setting or instability of the resulting dispersion than when the proportions are greatly different from the preferred. Proportions outside the range of satisfactory proportions are not to be used unless an incomplete or unstable dispersion of cellulose is permissible for a given purpose.

The temperature at which the cellulose is dissolved in the sodium zincate solution should be low. Preferably the temperature should be between about 5° C. and the temperature of crystallizing of water or other inorganic component of the solution.

If the dispersion made as described is to be stable and not subject to setting or stiffening on standing, the dispersion must not be held for a long time at the very low temperature of making the solution. Thus, a solution of cotton linters, paper or wood pulp made as described should be warmed promptly after the solution is substantially complete, to a temperature of about 15° C. or somewhat higher but below the temperature of gelation of the solution, suitably to about 15° to 30° C. Temperatures much above 30° induce gelation or setting of the dispersion to non-flowing condition.

While the actual period of time at which the solutions of modified or unmodified celluloses may be maintained at temperatures of 5° C. or lower will vary with the concentration of reacting materials and somewhat also with the kind of cellulose initially used, it is desirable that the total period of time below 5° should be of the order of 1 hour or less. In general, the lower the temperature used in making the solution, the shorter the period of time during which the dispersion may be maintained at that temperature without introducing the danger of setting, either at that particular time or later. Thus, the dispersion may safely be held at a temperature of 5° C. for a period of not more than about one hour or so, at 0° C. for not more than about one-half hour, and at −5° C. or lower for not more than about 15 minutes. In general, the total exposure to temperatures of 5° C. or lower should be not in excess of three hours.

Once the solution is effected, the warming is caused in any convenient manner as, for instance, by heating with steam in coils or a jacket, but preferably with hot water so as to avoid danger of local overheating, the solution being agitated continuously during warming so as to reduce further the possibility of objectionably uneven heating.

Proceeding as described, I form a solution (this term including dispersion) of cellulose that may be kept for months without setting to non-flowable condition, that is substantially clear except for a slight haze attributable to some undissolved zinc compound present or impurities in the cellulose, and from which cellulose may be precipitated as regenerated cellulose by treatment with a number of agents. Thus, the cellulose may be regenerated or precipitated by adding an acid in amount to neutralize a portion of the caustic soda present so that the remaining alkalinity will correspond to not more than that of about a 2% sodium hydroxide solution. The actual extent of neutralizing of the alkalinity required for precipitation varies somewhat as, for example, with the particular kind of cellulose used, the original proportions of sodium hydroxide and zinc oxide, and also the kind of acid used in effecting neutralization. Thus, the salts produced as by-products in neutralizing have themselves a precipitating effect which depends in extent upon the particular acid used in forming the salt. Sodium sulfate and zinc sulfate which are formed on the addition of sulfuric acid have a different and greater precipitating effect than sodium acetate and zinc acetate which are formed on using acetic acid as the acid to cause neutralization.

Salts alone may be used to cause precipitation of the cellulose as, for example, aluminum sulfate, sodium sulfate, calcium chloride, or sodium chloride.

Also, the cellulose may be precipitated by the addition of water to dilute the sodium zincate solution to an alkalinity corresponding approximately to that of a 2% sodium hydroxide solution, the exact dilution required varying somewhat with the temperature at which the dilution is made and the other conditions that affect precipitation with acid.

In addition, cellulose precipitates on warming of the solution to a moderately elevated temperature, such as within the range of about 50° C. up to the boiling point of the water present.

It should be understood, however, that when the precipitated cellulose is to be formed into a strand or film of satisfactory strength, then the precipitation should be effected by the addition of acid or an acid and a salt. Sulfuric acid is preferred as the acid for precipitation because of the very satisfactory nature of the cellulose so regenerated. When a mixture of acid and salt is used, then there is preferred a mixture of sulfuric acid and sodium sulfate, potassium sulfate, zinc sulfate, or the like.

Another agent that may be used for precipitating cellulose from the solution of sodium zincate is a moderately or more concentrated solution of an alkali metal hydroxide, as, for example, a sodium or potassium hydroxide solution of concentration 15 to 50% added in amount to make the final concentration of alkali in the cellulose solution equivalent to at least approximately 15% of sodium hydroxide.

In treating unmodified cellulose and preferably either modified or unmodified cellulose with a sodium zincate solution of kind and at the temperature described, the zincate solution is first precooled approximately to the temperature at which the cellulose is to be dissolved as, for instance, to 5° C. or lower. The cellulose is then introduced, preferably in finely divided form such as powdered paper pulp, ground purified cotton linters, or rayon floc. The fine state of subdivision of the cellulose and the precooling of the solution makes possible the completion of the dispersion and the subsequent warming, referred to above, before an excessively long period of time has elapsed.

The proportion of cellulose used originally will be determined in part by the viscosity and concentration of the dispersion desired. I have used to advantage cellulose in proportion up to 15 parts for 100 parts of the sodium zincate solution. Such high concentrations require the use of a regenerated or modified cellulose such as rayon or oxycellulose.

Using unmodified cellulose, as I preferably do, I dissolve ordinarily about 6 parts of the cellulose to 100 of the zincate solution although I may make a relatively viscous and concentrated solution using 6 to 10 parts of the cellulose. A somewhat larger proportion may be used up to 15 parts if it is satisfactory to have a thick, gelatinous product.

Obviously any proportion of the cellulose below 6% may also be used, except that the concentration of the finished dissolved cellulose is too low for ordinary commercial uses when the proportion of cellulose is much less than 2 parts for 100 parts of the zincate solution. With the very low concentrations below 2%, for instance, precipitation of the cellulose after application to a surface or after extrusion tends to give a discontinuous mass of the precipitated cellulose, whereas continuous films or strands are ordinarily desired.

The product of the invention is useful as a source of dissolved cellulose. Thus, it may be used in the form of the aqueous dispersion described for the treatment of textiles or for the formation of films or filaments of cellulose. In the treatment of textiles, for example, the solution at a concentration corresponding suitably to about 3 to 6% of cellulose is applied to the textile and the solution so applied is then treated with dilute sulfuric acid or other precipitating agent, so as to cause precipitation of the cellulose on the textile. In the making of filaments or sheets, as in the form of rayon or Cellophane, the solution is extruded through a suitable opening, or suitable openings and then coagulated or precipitated by sulfuric acid or the like.

The following specific examples illustrate the invention in greater detail.

Example I

Ten parts of sodium hydroxide are dissolved in ten parts of water and then three parts of zinc oxide are added, at a temperature that is preferably moderately elevated, say at 50° C. to 100° C., so as to cause rapid solution of the zinc oxide with the formation of sodium zincate. The zincate solution is then allowed to cool to normal temperature. To the zincate solution 70 parts of cracked ice are added and the resulting mixture is stirred. The temperature of the mixture reaches a minimum point at about −15° C. The ice in melting cools the mixture and supplies water so as to lower the concentration of zincate in the solution, the lowering of the concentration being progressive as the ice melts and the temperature falls.

In the meantime, 6 parts of finely ground wood cellulose are thoroughly wet and dispersed in 20 parts of water at normal temperature, the wood pulp having been previously ground in a conventional type of grinder or cutter for such pulp.

The slurry of the wood pulp is added to the precooled zincate solution, the whole mass being thoroughly stirred and the temperature being allowed to rise until the temperature within the mass is uniform, ordinarily about −3°, and until the cellulose is completely dissolved. This solution will occur practically immediately at the low temperature.

After complete solution of the cellulose, the mixture is warmed to a temperature of 15° C. and is then poured into containers.

An aging reaction takes place in the containers. The solution is allowed to stand at atmospheric temperature for about 24 hours before use. Thus the solution may be aged (ripened) at about 15° to 35° C. for 10 to 24 hours or so. During this period a change occurs that reduces greatly the viscosity of the solution. This aging reaction is particularly noticeable when unmodified cellulose is the kind of cellulose dissolved initially, and the cellulose solution is relatively concentrated, say 5% or higher. The greater the effect required on viscosity, the longer the aging period required.

A solution made as described in this example or more generally above does not set when subsequently cooled to −5° or −10° C., even for a long period of time, although the more concentrated solutions of unmodified cellulose become very viscous liquids at low winter temperatures.

Example II

I prepare the zincate solution in the same manner as above. In this example, however, I use 6 parts of rayon floc, slurry the rayon floc with 20 parts of water, and then add to the slurry 70 parts of cracked ice. The mixture is thoroughly stirred until the temperature of the slurry is 0° C. Then I add 23 parts of concentrated zincate solution and stir continuously until the temperature within the mass has reached about −3° C. and until the cellulose is completely dissolved. Normally the solution of the cellulose and the lowering of the temperature to −3° C. take only a few minutes. The solution is then warmed to a temperature of 25° C. and is ready for immediate use.

No aging is necessary with this particular type of solution made from modified cellulose of this concentration. When the concentration of the cellulose used as in this example is high, say 12 parts or more to 100 parts of the zincate solution, then the dispersion later described is aged for a day or so at atmospheric temperature before use.

Example III

To 23 parts of the zincate solution described in Example I, I add 25 parts of water. The solution is then warmed to approximately 50° C. The temperature is above that at which the zincate solution is an effective solvent for the cellulose. To the warmed mixture I add dry 6 parts of rayon staple fiber and stir the resulting mixture thoroughly, with cooling, to 25° C. Then I add 46 parts of ice to the mixture and continue stirring until the temperature has reached approximately 3° C. and until the cellulose is completely dispersed. I then warm the dispersion to approximately 15° C.

The dispersion prepared by this method normally has a higher viscosity than the dispersion made by the process given in Example II. For certain uses, however, this high viscosity is desired.

It will be understood that in the examples above, the ice used may be replaced by an equal weight of water provided some other source of refrigeration is used. When the ice is omitted, there may be substituted conventional cold brine coils or other refrigerating means to effect the cooling. The use of the cracked ice, however, is preferred and is highly desirable, because of the quickness and uniformity with which the cooling may be effected.

Certain subject matter herein disclosed but not claimed is claimed in my copending application Serial No. 483,817, filed April 20, 1943, and entitled Solubilized cellulose and method of making.

It will be understood that the details given are for the purpose of illustration and that variations within the spirit of the invention are intended to be included within the scope of the appended claims.

What I claim is:

1. In making a solution of cellulose, the method which comprises mixing unmodified cellulose with an aqueous solution of sodium zincate containing an excess of sodium hydroxide over the calculated proportion required to form the zincate, until the cellulose is substantially completely dissolved, the solution being effected at a temperature between the temperature of crystallizing of an inorganic component of the solution and about 5° C.

2. In making a solution of cellulose, the method which comprises forming a slurry of the cellulose with water, mixing the slurry with an aqueous solution of sodium zincate containing an excess of sodium hydroxide over the calculated proportion required to form the zincate, cooling, maintaining the resulting mixture at a temperature between the temperature of crystallizing of an inorganic component of the solution and about 5° C., until the cellulose is dissolved, and then warming the resulting solution to a temperature between about 15° C. and the temperature of gelation of the solution.

3. The method described in claim 1, the temperature at which the mixture is maintained during the dissolving step being about 5° to —5° C., the zincate solution containing sodium hydroxide in excess of that required theoretically to covert the zinc present to sodium zincate, and the solution containing the dissolved cellulose being warmed promptly after the cellulose is dissolved to a temperature between about 15° C. and 30° C.

4. In making a solution of cellulose, the method which comprises mixing cotton linters with an aqueous solution of sodium zincate containing an excess of sodium hydroxide over the calculated proportion required to form the zincate, until the cotton linters are substantially completely dissolved, the solution being effected at a temperature between the temperature of crystallizing of an inorganic component of the solution and about 5° C.

5. In making a cellulose material, the method which comprises forming a solution of unmodified cellulose by the method described in claim 1, the zincate solution used containing the equivalent of about 8 to 15 parts of sodium hydroxide and from 2 up to the saturation proportion of zinc oxide for 100 parts of water, and then adding and mixing in an acid to reduce the alkalinity and precipitate cellulose.

6. A composition of matter comprising an aqueous solution of sodium zincate and unmodified cellulose dissolved in the said solution, the said composition being produced by the method described in claim 1 and said composition being one which on acidification produces a precipitate of regenerated cellulose.

7. A composition of matter comprising an aqueous solution of sodium zincate and cellulose dissolved in the said solution, the said composition containing sodium hydroxide in excess of the proportion required theoretically to convert the zinc present to zincate and the composition being produced by the method described in claim 2.

SIDNEY MILTON EDELSTEIN.